United States Patent [19]

Gorrieri et al.

[11] Patent Number: 5,096,043
[45] Date of Patent: Mar. 17, 1992

[54] DEVICE FOR FEEDING PRODUCTS FROM A SUPPLY UNIT TO A RECEIVING UNIT

[75] Inventors: Giordano Gorrieri, Pianoro; Luciano Nannini, Casalecchio; Alberto Mondani, Bologna, all of Italy

[73] Assignee: Azionaria Costruzioni Macchine Automatiche A.C.M.A. S.p.A., Bologna, Italy

[21] Appl. No.: 560,355

[22] Filed: Jul. 31, 1990

[30] Foreign Application Priority Data

Aug. 25, 1989 [IT] Italy ................... 3600 A/89

[51] Int. Cl.<sup>5</sup> ............................ B65G 47/31
[52] U.S. Cl. .................. 198/461; 198/623; 198/626.5
[58] Field of Search ............ 198/461, 471.1, 484.1, 198/604, 623, 626.1, 626.2, 626.3, 626.5, 803.15

[56] References Cited

U.S. PATENT DOCUMENTS

| | | | |
|---|---|---|---|
| 2,358,292 | 9/1944 | Malhiot | 198/803.13 X |
| 3,482,674 | 12/1969 | Wiseman | 198/461 |
| 3,868,009 | 2/1975 | Billi et al. | 198/461 |
| 3,990,569 | 11/1976 | Aiuola | 198/461 |
| 4,041,822 | 8/1977 | Gabel | 198/803.13 X |
| 4,059,187 | 11/1977 | Rueff et al. | 198/461 |
| 4,195,723 | 4/1980 | Loewenthal | 198/461 |

*Primary Examiner*—D. Glenn Dayoan
*Attorney, Agent, or Firm*—Klauber & Jackson

[57] ABSTRACT

A device for feeding products, e.g. soaps, from a manufacturing machine to a wrapping machine, and comprising a first and second conveyor belt cooperating with each other and powered at different speeds. The first conveyor belt presents a number of equally spaced supporting elements for respective soaps, having respective reaction elements designed to flank a first side of a respective soap. The second conveyor belt presents a number of equally spaced positioning elements, each designed to flank a second side of a respective soap opposite the first side. Each reaction element faces a respective positioning element and defines, with the same, a compartment for receiving a respective soap and the size of which, measured in the traveling direction of the first and second conveyor belt, is greater than that of the soaps at the point wherein the soaps are transferred into the compartments, and is gradually reduced until it substantially equals the size of the soaps at a point downstream from the transfer point.

6 Claims, 3 Drawing Sheets

DEVICE FOR FEEDING PRODUCTS FROM A SUPPLY UNIT TO A RECEIVING UNIT

BACKGROUND OF THE INVENTION

The present invention relates to a device for feeding products from a supply unit to a receiving unit.

In particular, the present invention may be employed to advantage on soap manufacturing and packing systems, for feeding the soaps, equally spaced, from the manufacturing to the wrapping machine.

On known systems, the soaps coming off the manufacturing machine are fed randomly spaced and usually by means of a conveyor belt to a device by which they are equally spaced.

One such device, described for example in Italian Patent Application No. 3679A/88 filed on Nov. 30, 1988 by Azionaria Costruzioni Macchine Automatiche A.C.M.A. S.p.A., picks the soaps up successively off the conveyor belt by means of suction heads fitted with suckers. The suction heads are arranged equally spaced and designed to pick up the soaps off the conveyor belt as they travel, at a different speed from the suction heads, beneath the respective suckers.

The soaps picked up in substantially equally spaced manner by the suction heads are then inserted successively inside equally spaced compartments on a second conveyor belt by which they are fed to the wrapping unit.

Insertion of the soaps into the compartments on the second conveyor belt, however, poses numerous drawbacks, in that the soaps are rarely centered perfectly in relation to the suckers, and can only be safely inserted inside the compartments on the second conveyor belt by allowing a good deal of clearance between the compartment and the soap. As such, the position of the soap inside the compartment is poorly defined, which obviously leads to further problems at the wrapping stage. In fact, for the wrapping unit to function properly, the incoming soaps must be accurately positioned to prevent them from being damaged during application and folding of the wrapping material and, even if such damage is avoided, to enable the wrapping unit to apply and fold the wrapping material correctly in relation to the soaps.

SUMMARY OF THE INVENTION

The aim of the present invention is to provide a device for feeding products, in particular soaps, from a supply unit to a receiving unit, and which provides for accurately positioning and equally spacing said products prior to feeding the same on to the receiving unit.

With this aim in view, according to the present invention, there is provided a device for feeding products from a supply unit to a receiving unit, characterised by the fact that it comprises first and second conveyor means cooperating with each other and powered respectively at a first and second speed; said first conveyor means presenting a number of supporting elements equally spaced according to a first given pitch and having respective reaction elements; and said second conveyor means presenting a number of positioning elements equally spaced according to a second given pitch; each said reaction element facing a respective positioning element and defining, with said positioning element, a compartment for receiving a said product, and the size of which, measured in the traveling direction of said first and second conveyor means, is variable, said size exceeding that of said products at the transfer point wherein said products are transferred into said compartments, and gradually becoming smaller until it substantially equals the size of said products at a point located downstream from said transfer point.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
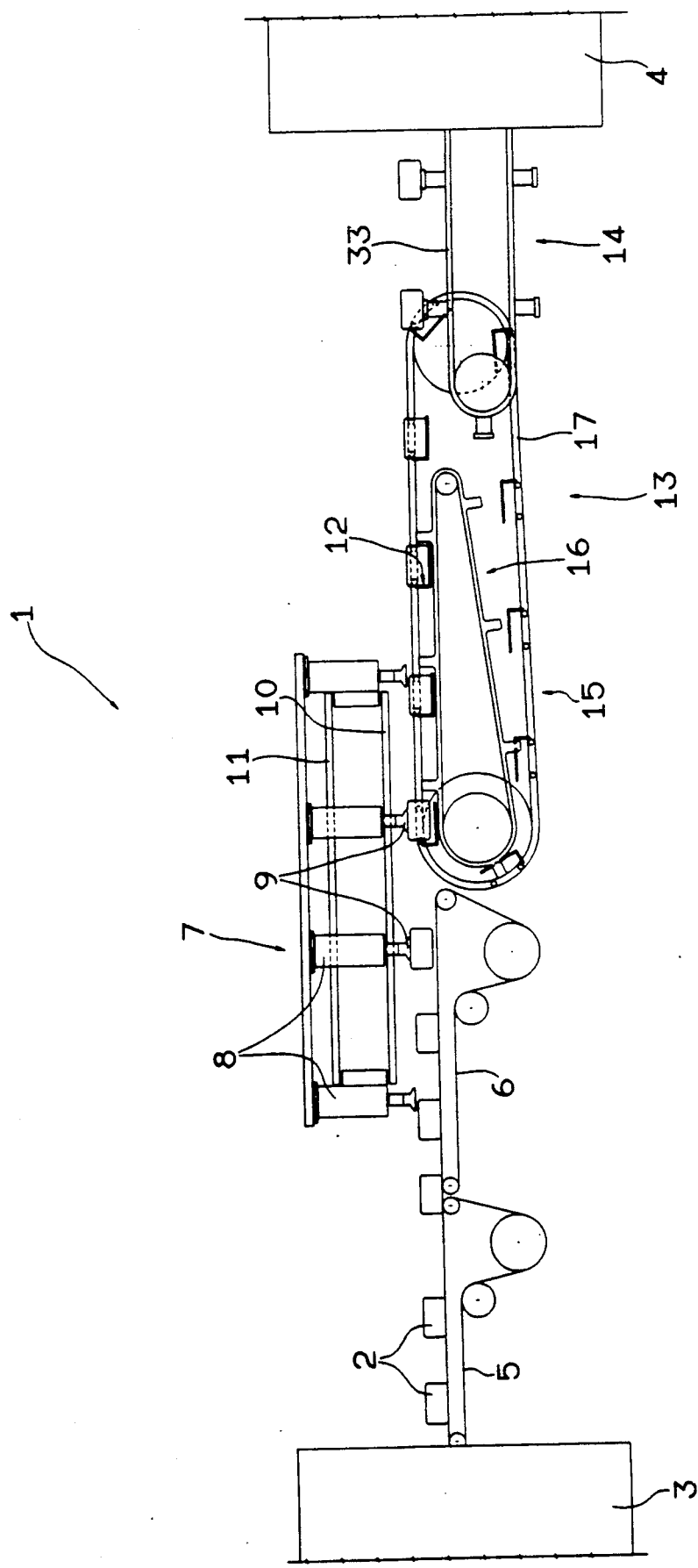
FIG. 1 shows a schematic view of a device in accordance with the teachings of the present invention.

Number 1 in FIG. 1 indicates a device for transferring soaps 2 from a supply unit, consisting of a soap manufacturing machine indicated schematically by block 3, to a receiving unit consisting of a wrapping machine indicated schematically by block 4.

Manufacturing machine 3 feeds soaps 2 successively and in randomly spaced manner on to a horizontal conveyor belt 5 by which soaps 2 are fed on to a further horizontal conveyor belt 6 located beneath a known conveying device 7 designed to equally space soaps 2 and of the type described in Italian Patent Application No. 3679A/88.

Conveying device 7 substantially comprises a number of equally spaced, vertically operating suction heads 8 fitted on the bottom with respective suckers 9. Suction heads 8 are supported on two chains 10 and 11, each looped about two powered vertical gears (not shown) for moving suction heads 8 over and in the same direction as conveyor belt 6.

Suckers 9 operate vertically in relation to respective heads 8, for successively picking up soaps 2 off conveyor belt 6, by virtue of known actuating means (not shown), and successively depositing the same inside respective compartments 12 on a horizontal conveying device 13 located downstream from conveyor belt 6. From conveyor 13, soaps 2 are fed successively on to a horizontal conveyor belt 14 by which they are fed on to wrapping machine 4.

Figure 2:
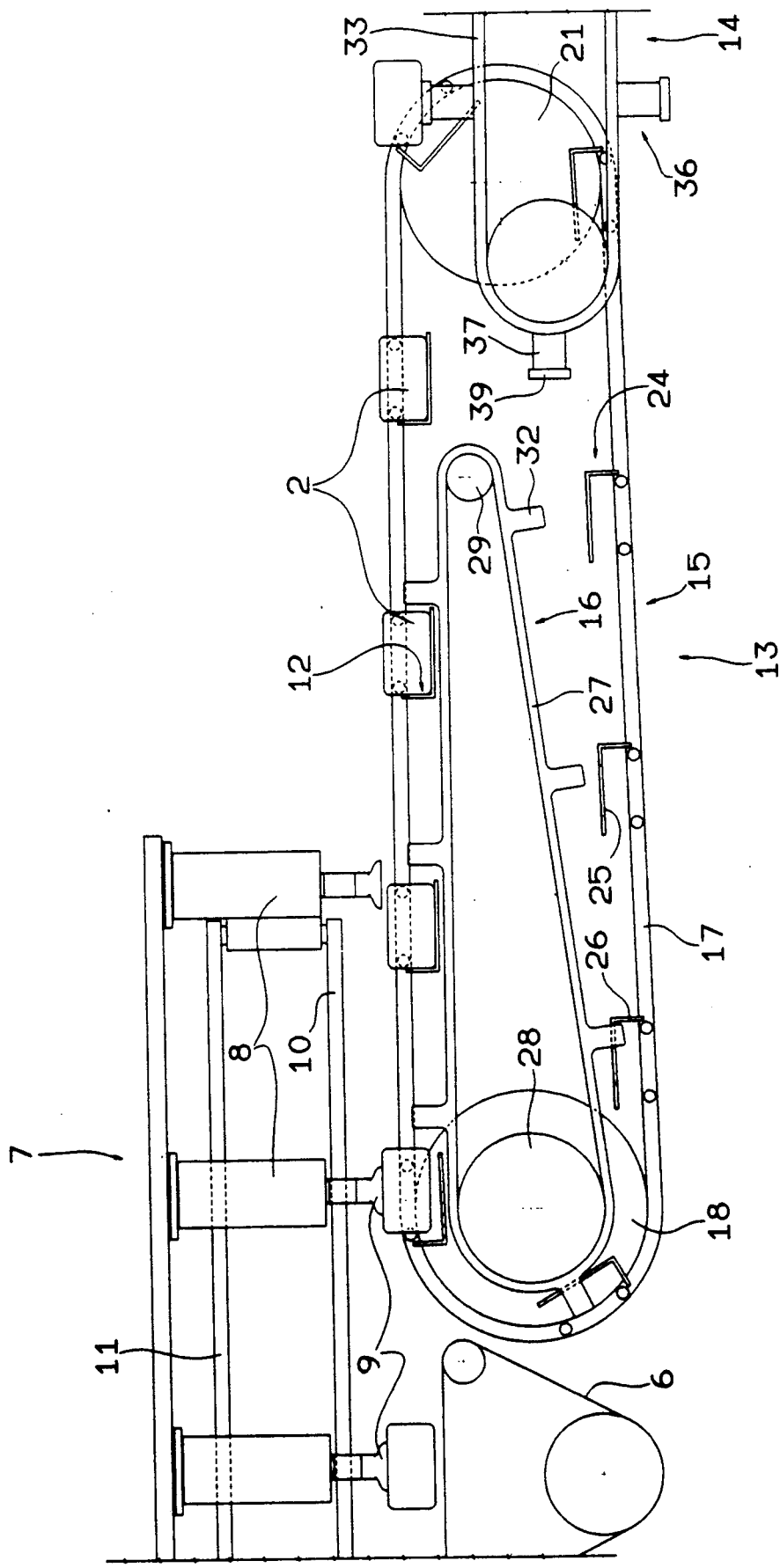
FIG. 2 shows a larger-scale view of a detail in FIG. 1.
Figure 3:
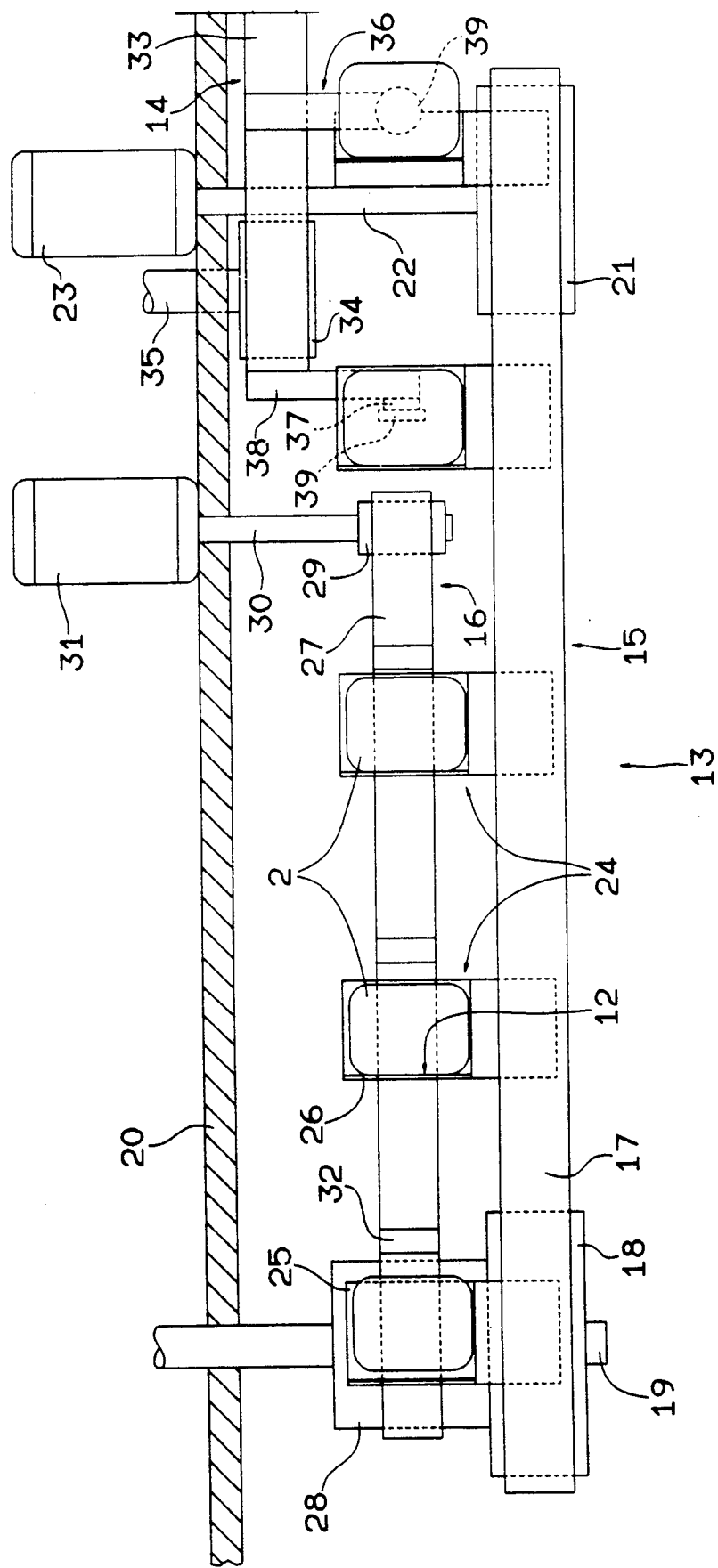
FIG. 3 shows a plan view of the FIG. 2 detail.

As shown, particularly in FIGS. 2 and 3, conveyor device 13 comprises two conveyor means consisting of conveyor belts 15 and 16, the latter substantially housed inside the former, and the top branches of which are substantially horizontal and coplanar.

Conveyor 15 comprises a belt 17 looped about an idle roller 18 supported on a shaft 19 in turn supported on bed 20 of device 1, and about a roller 21 fitted on to a shaft 22 parallel to shaft 19 and connected to a motor or drive means 23. On the side facing bed 20 (see also FIG. 3), belt 17 supports a number of laterally projecting, equally spaced supporting elements 24 having substantially the same spacing as suction heads 8 along conveyor 15 and extending inwards from belt 17 (FIG. 2). Each supporting element 24 comprises a base plate 25 connected to belt 17 and the rear portion of which (with reference to the traveling direction of conveyor 15) supports a reaction element or tab 26 perpendicular to plate 25 and the top branch of belt 17.

Conveyor belt 16 comprises a belt 27 looped about an idle roller 28 fitted on to shaft 19 between roller 18 and bed 20 and smaller in diameter than roller 18, and about a roller 29 housed inside the loop defined by conveyor 15 and fitted on to a horizontal shaft 30 connected to a motor or drive means 31.

The outer surface of belt 27 is fitted with a number of equally spaced positioning elements 32, the center distance of which is shorter by a given amount as compared with supporting elements 24. Each positioning element 32 consists of a parallelepiped bar arranged crosswise in relation to belt 27, with its lateral surface adhering to the same. Each bar 32 defines, together with facing tab 26, one of said compartments 12.

Conveyor belt 14 comprises a belt 33 located between conveyor 15 and bed 20, and looped about an idle roller 34 and a powered roller (not shown) located downstream from conveyor device 13 with reference to the traveling direction of the same. Roller 34 is supported on a horizontal shaft 35, beside a portion of the loop defined by conveyor 15, between roller 29 and roller 21. The outer surface of belt 33 is fitted with a number of projecting, equally spaced supporting elements 36 facing belt 17 and having substantially the same spacing as supporting elements 24. Each supporting element 36 substantially comprises a cylindrical body 37 perpendicular to the surface of belt 33 and connected to the same by a bracket 38, the free end of which supports a coaxial supporting plate 39.

For reasons that will be made clear later on, the speed at which belt 27 is driven by motor 31 is lower than that at which belt 17 is driven by motor 23, and belt 33 travels at the same speed as belt 17. Moreover, the pitch ratio of supporting elements 24 and positioning elements 32 is preferably equal to the traveling speed ratio of conveyor belts 15 and 16.

In actual use, soaps 2 are fed successively and randomly spaced off manufacturing machine 3 on to conveyor belt 5 and from there on to conveyor belt 6.

As they travel along conveyor belt 6, soaps 2 are picked up successively by suckers 9 on suction heads 8, and are substantially equally spaced to match the spacing of suckers 9.

Soaps 2 are then inserted successively by suction heads 8 into compartments 12 of conveyor device 13, the length of said compartments 12, at the point wherein soaps 2 are transferred from conveyor device 7 and measured in the traveling direction of conveyor belt 15, is greater than that of soaps 2 measured in the same direction.

Said difference in the length of compartments 12 and soaps 2 at the point wherein soaps 2 are loaded inside compartments 12 depends on the difference in speed between conveyor belts 15 and 16, which speed difference is so selected that, at the point wherein conveyor device 7 feeds soaps 2 into compartments 12, the distance between each tab 26 and the foregoing positioning element 32 is greater than the length of soaps 2 measured in said direction.

This provides for inserting soaps 2 smoothly inside compartments 12, even in the event of soaps 2 being imperfectly centered on suckers 9.

As they are transferred by conveyor device 13, soaps 2 are housed inside compartments 12 with tabs 26 flanking one side and positioning elements 32 flanking a second side opposite the first. By virtue of positioning elements 32 traveling at a slower speed than respective supporting elements 24, the distance between positioning elements 32 and facing tabs 26 is gradually reduced so that the length of compartments 12 is substantially equal to that of soaps 2 at the point wherein soaps 2 are picked off conveyor device 13 by supporting elements 36 of conveyor belt 14.

By gradually reducing the size of compartments 12 as described above, soaps 2 are eventually perfectly positioned and equally spaced in relation to conveyor belt 15, from which they are fed successively on to conveyor belt 14 and by this to wrapping machine 4.

Device 1 as described above thus provides for feeding soaps 2 in equally spaced manner from machine 3 to machine 4.

It will be noted that location of supporting elements 24 inwards of belt 17 provides for smooth, gradual release of soaps 2 as these are fed on to conveyor belt 14. To those skilled in the art it will be clear that numerous changes may be made to device 1 as described and illustrated herein without, however, departing from the scope of the present invention.

For example, according to a variation not shown, conveyor belt 16 may be located outside and over conveyor belt 15, between conveyor device 7 and belt 14, in which case, positioning elements 32 of conveyor belt 16 may still cooperate with tabs 26 of supporting elements 24 for defining the length of compartments 12. Moreover, according to a further variation not shown, tabs 26 may be provided on the front portions of supporting elements 24 (with reference to the traveling direction of conveyor belt 15) and positioning elements 32 located in such a manner as to define the rear portions of compartments 12. In this case, conveyor belt 16 and positioning elements 32 will be operated at a greater speed than conveyor belt 15, so as to gradually reduce the length of compartments 12 by moving tabs 26 up to positioning elements 32.

Moreover, conveyor belts 15 and 16 may present other than straight, horizontal transportation surfaces, providing they are capable of receiving soaps 2 inside compartments of variable length as described above.

We claim:

1. A device for feeding products from a supply unit to a receiving unit, comprising:
   first conveyor means for conveying said products, said first conveyor means including a plurality of supporting element means for supporting said products, said supporting element means being equally spaced therealong with a first pitch, each said supporting element means having a reaction element,
   second conveyor means for conveying said products, said second conveyor means cooperating with said first conveyor means and including a plurality of positioning elements equally spaced therealong with a second pitch, each said positioning element facing a respective said reaction element and defining a compartment therewith for receiving one said product,
   first power means for moving said first conveyor means at a first speed, and
   second power means for moving said second conveyor means at a second speed such that the size of each said compartment, measured in the traveling direction of said first and second conveyor means, exceeds the size of said products at a transfer position where the products are transferred into said compartments and gradually becomes smaller thereafter until said size of each said compartment substantially equals the size of said products at a position located downstream from said transfer position.

2. A device according to claim 1, wherein said first conveyor means includes a first conveyor belt and said second conveyor means includes a second conveyor belt.

3. A device according to claim 2, wherein said supporting element means are located inwardly of said first conveyor belt.

4. A device according to claim 1, wherein the ratio of said first pitch to said second pitch is equal to the ratio of the speed of movement of said first conveyor means to the speed of movement of said second conveyor means.

5. A device according to claim 1, wherein the speed of movement of said first conveyor means is greater than the speed of movement of said second conveyor means.

6. A device for feeding products from a supply unit to a receiving unit, comprising:

first conveyor means for conveying said products, said first conveyor means including a first conveyor belt and a plurality of supporting elements equally spaced therealong with a first pitch, each said supporting element having a reaction element, and said first conveyor belt defining a loop and having a transportation surface, second conveyor means for conveying said products, said second conveyor means cooperating with said first conveyor means and including a second conveyor belt and a plurality of positioning elements equally spaced therealong with a second pitch, each said positioning element facing a respective said reaction element and defining a compartment therewith for receiving one said product, and said second conveyor belt being substantially housed inside the loop defined by said first conveyor belt and having a transportation surface, the transportation surfaces of said first and second conveyor belts being substantially coplanar, first power means for moving said first conveyor means at a first speed, and second power means for moving said second conveyor means at a second speed such that the size of each said compartment, measured in the traveling direction of said first and second conveyor means, exceeds the size of said products at a transfer position where the products are transferred into said compartments and gradually becomes smaller thereafter until said size of each said compartment substantially equals the size of said products at a position located downstream from said transfer position.

* * * * *